Dec. 7, 1965  G. F. HITT  3,221,787
ADJUSTABLE CHUCK ASSEMBLY
Filed May 3, 1963  2 Sheets-Sheet 1
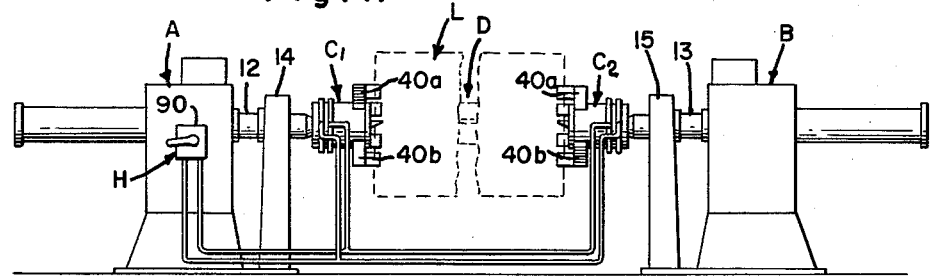
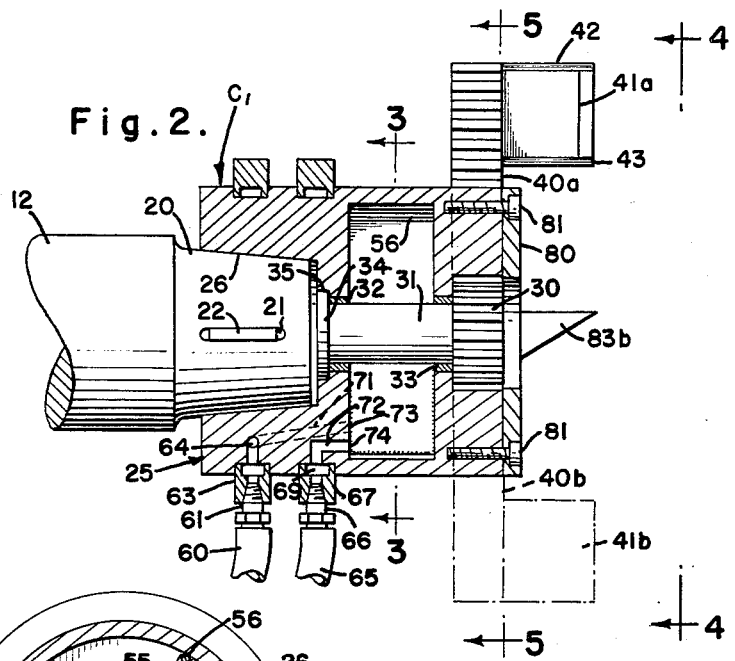
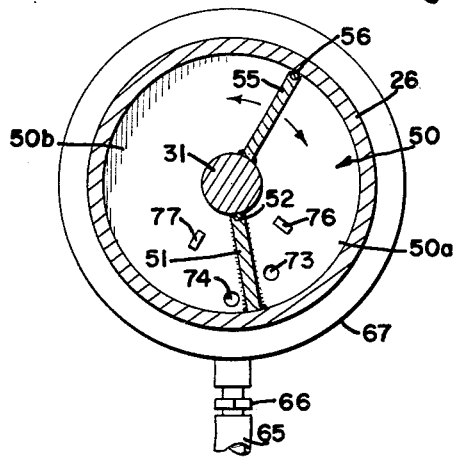
INVENTOR.
George F. Hitt
BY
Townsend and Townsend
attorneys United States Patent Office 3,221,787
Patented Dec. 7, 1965

3,221,787
ADJUSTABLE CHUCK ASSEMBLY
George F. Hitt, 937 10th St., Arcata, Calif.
Filed May 3, 1963, Ser. No. 277,765
4 Claims. (Cl. 144—209)

This invention relates to an adjustable chuck for a log peeling machine.

In log peeling or veneer-cutting machines, it is common to place a large log between head and tail stock assemblies. The log is thereafter gripped and supported at each end by a pair of chucks and rotated to cutting speed. A veneer-cutting tool which is spaced adjacent the outer circumferential surface of the log is then moved inward toward the log axis at a predetermined rate to peel off a thin sheet of wood.

Initially the log has a relatively large radius and mass which create high inertial force when the log is started from dead stop and rotated to cutting speed. Consequently, by supplying turning torque forces with a small chuck, the log gripping chuck dogs shear the log end wood and thus loosen their grip. In addition, tangential forces, originating at the veneer-cutting tool, can set up a braking torque force directed opposite of the turning torque force. As turning torque force is increased to overcome the braking torque, the increased forces can also cause the dogs to shear the log wood and loosen their grip.

If a chuck having a relatively large radius is used to provide the high torque, the probability of the log gripping dogs shearing through the end wood is reduced. A shortcoming of using large radius chucks is that the cutting blade of the veneer-cutting machine quickly approaches the peripheral edge of the chuck face plate as the log radius is reduced by peeling. Thus a large portion of the log has to be discarded or the chuck radius reduced.

Chucks have been constructed which have removable or interchangeable chuck face plates in which a face plate having a larger radius is first used on the large logs. One chuck of this type of which I am familiar is described in U.S. Patent No. 2,879,816 for Chuck Assembly for Veneer Cutting Lathes, issued May 31, 1959, to C. K. Cook et al., of which I am a joint inventor. When the log diameter is reduced to near the diameter of the outermost circumferential edge of the chuck, log rotation is stopped, and the log is cradled by a suitable hoist. The chuck is then withdrawn from the end wood and the larger diameter outer face plate knocked off. The remaining smaller diameter inner face plate is rammed back into the wood and operation restarted. This arrangement eliminates the need for removing the chuck from the lathe spindle but it does require the lathe stop and log cradling steps of operation.

An object of this invention is to provide a chuck for a log peeling lathe in which a plurality of arms are slidably mounted for tangential movement relative to the chuck axis of rotation to extend and retract the outermost ends thereof relative to the peripheral edge of a face plate, each arm having a dog means projecting from the outer extremity thereof for gripping the log wood as the chuck is rammed axially toward the log.

A feature and advantage of this invention resides in the fact that the arms can be extended during initial operation to supply high torque forces having relatively low level tangentially directed forces when the log diameter is large and which arms can be retracted toward the face plate peripheral surface when the log radius is reduced by cutting.

A feature and advantage of this invention resides in the fact that there is no delay or shut down of the lathe operation while the chuck size is being changed.

Another feature and advantage resides in the fact that the need for cradling the log when the chuck size is changed is eliminated.

Another object of this invention is to provide a chuck having a blade-like dog secured on the outermost ends of each of a pair of extendable and retractable arms, each dog being mounted to project from the plane of arm rotation and extend in the direction of arm sliding movement so that the dog will cut through the log wood as the chuck arm are retracted.

Another object of this invention is to provide a blade along the leading edge of a blade-like dog to permit the dog to slice through the log wood as the arms are retracted.

Another object of this invention is to provide a drive means for slidably extending the arms between a first outermost position and a second innermost position, the drive means including a chamber and piston which rotatably drives a gear means for slidably moving the arms.

A feature and advantage of this drive means resides in the fact that driving energy can be supplied throughout the entire 360° of chuck rotation.

Other objects and advantages of this invention will become apparent by reading the following specification and referring to the accompanying drawings in which similar characters of reference represent corresponding parts in each of the several views.

In the drawings:

FIGURE 1 is an elevational view of the veneer-cutting machine illustrating the adjustable chuck assembly of this invention;

FIGURE 2 is an enlarged sectional view of the chuck assembly with the chuck jaws in the extended position;

FIGURE 3 is a sectional view of the chuck assembly taken as indicated by the lines 3—3 of FIGURE 2;

Figure 4:
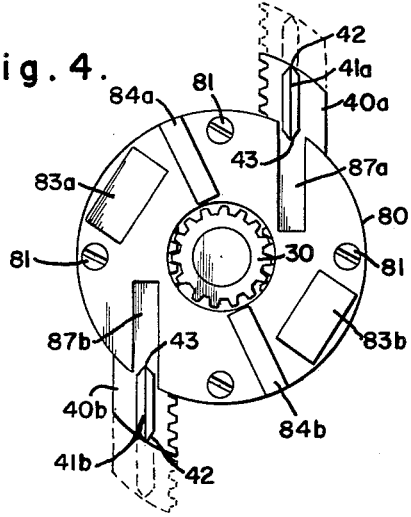
FIGURE 4 is an end view of the chuck assembly taken as indicated by lines 4—4 of FIGURE 2.

Referring to FIGURE 1, there is somewhat schematically illustrated a log peeling lathe of the type that can be used with this invention. Headstock A and tailstock B both include a source of power, not shown, for rotatively driving their respective associated live spindles 12 and 13. In order to provide additional vertical support for the spindles, steady rests 14 and 15 are spaced adjacent the headstock A and tailstock B, respectively. Spindles 12 and 13 are coaxially aligned and extend through steady rests 14 and 15. Secured to the end of each spindle 12 and 13 is chuck assembly $C_1$ and $C_2$, respectively. A log generally indicated by L is positioned between headstock A and tailstock B and spindles 12 and 13 are axially driven in a ram like motion to sink dogs positioned on the chuck face plate into the end wood. Power is then applied by both headstock A and tailstock B to rotate log L, and cutting tool D is then moved toward the log's circumferential surface to slice off a continuous sheet of wood in a general peeling action.

As will be explained later in more detail, a hydraulic control mechanism H is provided for adjusting the length of the chuck jaws or arms 40a and 40b to compensate for a variety of log sizes and cutting conditions. The previously discussed high-inertia and torque problems are substantially eliminated by extending the arms during starting and the first stages of lathe operation. By retracting arms 40a and 40b when the diameter of log L is reduced, the problems of replacing chucks are eliminated.

As illustrated in FIGURE 2, end 20 of spindle 12 is in th shape of a frustum having a keyway slot 21 extending radially therethrough. An associated key 22 is adapted to be forced therein to secure housing 25 of chuck $C_1$ in relatively non-rotating, semi-permanent arrangement thereon. The tapered walls of female spindle connector 26 in the end wall of housing 25 form a tight fit with frustum-shaped spindle end 20. Any rotation of spindle 12 is thus transmitted directly to the housing 25 of chuck $C_1$.

A rack and pinion gear arrangement is provided at one end of housing 26 for extending and retracting the chuck arms. As pinion gear 30 is rotated relative to housing 25, rack gears on arms 40a and 40b are simultaneously extended or retracted depending upon the direction of pinion gear rotation.

Pinion gear 30 is rotatably mounted on shaft 31 in coaxial relationship with housing 25. The pinion gear shaft 31 extends through the entire housing and is supported by bearing means 32 and 33 for free rotation. Flat head portion 34 at one end of shaft 31 fits within depression 35 at the end wall of female spindle connector 26. This and the inside shoulder of pinion gear 30 secures shaft 31 against axial motion.

Power means is provided for controlling the rotation of pinion gear 30 which includes a power chamber 50 formed within the interior portion of housing 25. This power chamber is generally cylindrical shaped and is concentric with pinion gear shaft 31 as illustrated in FIGURE 3. A radially extending dividing wall 51 having a generally rectangular shape is weldably secured along at least one edge to the wall of chamber 50 to prevent any relative rotation between the housing 25 and walls 51. The innermost edge of dividing wall 51 includes a sealing means 52 which contacts the peripheral surface of pinion gear shaft 31 to allow sliding motion therewith. Additional sealing means can be provided along any edge of dividing wall 51 which is not secured to the chamber walls. Such sealing means can be of any conventional design and should be sufficient to withstand high hydraulic pressures to the order of 1200 p.s.i. or more.

A radially extending vane type piston 55 having a general rectangular shape is securely welded at its innermost edge to pinion gear shaft 31. By securing shaft 31 to piston 55 in this manner, movement of piston 55 will cause shaft 31 and the associated pinion gear 30 to rotate. In order to divide power chamber 50 into two distinct variable volume chambers 50a and 50b, sealing means 56 extends around the three unsecured edges of the piston 55. It is only required that sealing material 56 be sufficient to allow sliding motion between piston 55 and chamber walls and to prevent passage of high pressure fluid from one variable volume chamber to the other.

Two fluid supply hoses 60 and 65 for providing the power for power chamber 50 are threadably connected by nipples 61 and 66 to the slip rings arrangement 63 and 67, respectively. Each of the slip rings 63 and 67 is held secure against rotation so that rotary motion of the chuck body 25 will not cause the rings to rotate. Channel shaped openings 64 and 69 are provided along the inner surface of each slip ring to provide a path of continuous fluid flow during rotation of housing 25. As chuck housing 25 rotates, the slip rings 63 and 67 remain stationary and fluid is transferred from hoses 60 and 65 through the slip rings to channels 64 and 69 and to the respective passageways 71 and 72 formed in the chuck body. It can thus be seen that pressurized fluid can be supplied continuously throughout the entire 360° rotation of chuck $C_1$.

Orifices 73 and 74 of passageways 71 and 72 respectively are positioned on opposite sides of the dividing wall 51. As fluid is injected through either one of these orifices and exhausted through the other, the vane like piston 55 is rotated by the pressure differential between chambers 50a and 50b. In order to prevent the piston 55 from rotating too far and damaging dividing wall 51, or from sealing the orifices 73 or 74, stop means 76 and 77 are provided on both sides of the wall. As the piston 55 rotates, it eventually contacts one or the other of these stop means and is effectively prevented from rotating further.

A face plate 80 which includes a plurality of non-adjustable dog means for gripping the log end wood is secured to the end of housing 25. As illustrated in FIGURES 2 and 4, face plate 80 is firmly secured to housing 25 by means of four bolts 81. A plurality of dogs 83a and 83b and 84a and 84b having a sharp blade like edge are secured to face plate 80 and project in the direction of the chuck axis. By so arranging these dogs, the blade edges can be driven deeply into the end wood of a log when the spindle 12 is rammed axially toward the log.

Figure 5:
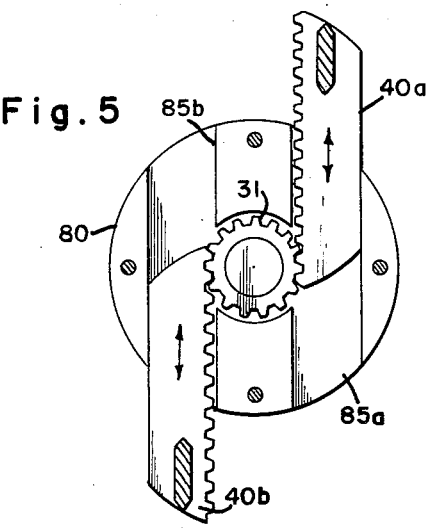
FIGURE 5 is a sectional view taken as indicated by the lines 5—5 of FIGURE 2.

The two extensible and retractable rack gear arms 40a and 40b are slidably mounted within channels 85a and 85b of face plate 80. Each parallel channel 85a and 85b has a generally rectangular cross section and is formed in the rearward portion of the face plate 80 as illustrated in FIGURES 2 and 5. The channels extend across the rearward face of the face plate 80 in a chord like manner and are of sufficient dimension to allow slidable reciprocating motion of the rack arms 40a and 40b, respectively. In spacing the channels 85a and 85b, they should be near enough to the chuck center to permit the teeth of pinion gear 31 to extend into the channel area. This portion of the pinion gear teeth meshes with the rack gear teeth to simultaneously extend or retract arms 40a and 40b within the channels as pinion gear 30 rotates. Face plate 80 also includes two slots 87a and 87b formed therein which extend from the front face through to channels 85a and 85b respectively for receiving a pair of adjustable dogs 41a and 41b.

The blade edged dogs 41a and 41b are secured to the outer ends of arms 40a and 40b respectively. These dogs also extend in the direction of the chuck axis to permit their being rammed into the log wood. When these retractable dogs 41a and 41b are in their fully retracted position, they are received by slots 87a and 87b in order to provide a greater reduction in chuck diameter. Additional cutting blades 42 and 43 are provided along the side edges of dogs 41a and 41b so that they are able to slice through the log wood as the rack arms are withdrawn toward the slots.

Since chuck $C_2$ is identical to chuck $C_1$, the foregoing description is also applicable and there is no need to repeat it.

In accordance with the principles of this invention chuck arms 40a and 40b are initially in the extended position as illustrated by the dotted lines in FIGURE 4. Coaxial spindles 12 and 13 are simultaneously driven axially toward log L and chucks $C_1$ and $C_2$ respectively are rammed into the ends of the log L. The projecting sharp blade edges of the dogs 83a, 83b, 84a and 84b on face plate 80 and the blade like edges of dogs 41a and 41b on arms 40a and 40b are all driven deeply into the end wood of the log. Log L is thus supported and aligned between the two chucks $C_1$ and $C_2$. Torque is then applied to each of spindles 12 and 13 causing the associated chucks $C_1$ and $C_2$ to rotate in unison. Since the sharp dogs have been driven deeply into the end wood by the axial ramming motion, they bite the wood and transfer the rotational force to the large diameter log L.

Since log L initially has a very large radius and large mass, the inertial force which has to be overcome during starting operation is quite substantial. In order to overcome it, a high torque force is needed. If the distance from the chuck axis to the dogs is short, the tangentially directed forces are quite high. This can, in many instances, cause a shearing of the end wood by the dogs to thus loosen the grip of the chucks.

By increasing the distance of some of the dogs from the chuck axis, it is possible to develop the same torque force but with a much lower tangentially directed force. The reason for this is that the increase in moment arm length permits the same amount of torque or foot-pounds to be developed about the axis with a lower tangential force.

This decrease in tangential force is proportional to the increase in moment arm length.

As cutting tool B slices into the outer circumferential surface of log L a tangentially directed force is set up in opposition to the turning force applied to chucks $C_1$ and $C_2$. If the radius of log L is substantially greater than the distance from the chuck axis to the outermost dogs, it is possible that a relatively low tangentially directed braking force at the cutting blade would have to be overcome by a substantially greater tangentially directed force at the dogs in order to maintain cutting speed. This increased force could be sufficient to tear and shear the wood at the end of log L in the same manner as previously mentioned in discussing inertia forces. By extending the chuck arms during the initial stages when the log diameter is quite large, this problem is also overcome since the increased length in the moment arm will supply a higher torque with a lower tangentially directed force.

As the cutting blade D moves in toward the log axis the radius of the log is reduced and the blade approaches the outermost edge of the extended arms 40a and 40b. By adjusting lever 90 on hydraulic system H, arms 40a and 40b can be retracted by means of the power cylinder, and rotary piston and pinion gear which cause the associated rack gear arrangement to be drawn inward.

With arms 40a and 40b fully extended, piston 55 would be against stop 77. High fluid pressure would be directed through orifice 73 to direct a counterclockwise pressure against piston 55 to hold it securely in position against the stop 77.

When the operator desires to retract the arms 40a and 40b the lever 90 and hydraulic system H are thrown to second position and orifice 73 then acts as an exhaust port while the high pressure fluid is then directed through orifice of port 74 to thus create a pressure differential on each side of the piston which results in force directed in a clockwise direction. This force will cause piston 55 to move in a clockwise direction within power chamber 50 and simultaneously rotate the pinion gear shaft 31 and connected pinion gear 30. By appropriate control mechanism, it would be possible to control the pressure differential across the piston 55 to thus maintain or control the amount of rotation of the pinion gear 30 to thus hold the piston 55 at some intermediate point between stop 77 and stop 76. When piston 55 does reach maximum clockwise rotation it is halted by the stop 76 and prevented from moving any further. At this position the arms are fully withdrawn into the innermost position and dogs 41a and 41b are within face plate slots 87a and 87b.

It can be seen that as pinion gear 31 rotates and moves each of the arms 40a and 40b in a reciprocal motion, the sharp blade like edges 43 on dogs 41a and 41b are forced through the end wood in a cutting motion as they are retracted toward the slots 87a and 87b respectively.

It is fully possible to use conventional hydraulic control mechanisms which will withdraw the arms in small increments. In such an arrangement it would only be necessary to control the pressure differential across the piston 55 so that the piston could be held in a state of equilibrium balance at different points within chamber 50. That is, have equalized pressure on each side of the piston 55. It would also be possible to control the amount of arm retraction by reducing the fluid pressure differential across piston 55 such that there is insufficient force transmitted to the rack gears to cause the cutting edge 43 of dogs 41a and 41b to slice through the end log wood. The arms 40a and 40b could thus be held in a balanced position at any point between full retraction and full extension. Although the invention has been generally described as using high pressure fluid medium, it should be understood that this fluid can be gaseous or liquid. Thus, it would be fully possible to use an incompressible fluid at high pressure to drive the piston until the desired position is reached and at that time seal the outlet and inlet ports to form a volume or fluid displacement engine which would hold the piston in the desired state of equilibrium with equal pressure on each side of the piston. Or air pressure could be used wherein pressure differentials would be maintained across the piston face at all times.

While one embodiment of this invention has been illustrated and described, it is understood that other changes and applications may be made in the details, parts and arrangements thereof without departing from the scope of the invention as limited only by the scope of the appended claims.

What is claimed is:

1. In a log peeling lathe of the type having an axially and rotatably movable spindle carrying a face plate on the end of the spindle, at least one arm slidably mounted on the body of said face plate for radial movement relative to said face plate, means connected to said face plate for extending a first end of said arm substantially beyond the periphery of said face plate and to retract said arm to a position substantially coincident with the periphery of the face plate, said arm having outwardly facing log engaging dogs mounted on the first end of the arm, said dogs being formed with cutting edges facing the direction of sliding movement of said arm.

2. In a log peeling lathe of the type having an axially and rotatably movable spindle carrying a chuck support assembly comprising: a pair of arms slidably mounted within the body of said support assembly, power means mounted within the support assembly being connected to slidably move said arms radially outwardly from said spindle, said power means having inlet and outlet means connecting said power means to a source of energy including a drive shaft rotatably mounted within said support housing and having a drive gear secured to one end, said power means being connected to convert said energy to rotate said drive gear, said drive gear being positioned between each said arm, said arm including gear teeth along one edge thereof for meshing with the drive gear to simultaneously extend or simultaneously retract said arms in diametrically opposite directions as the gear means rotates, log wood gripping dog secured to each said arm and projecting therefrom for engaging the end of the log, said power means including a cylindrical power chamber positioned annularly of said drive shaft, a dividing wall extending radially of the drive shaft secured to the chamber walls and positioned between the inlet and outlet means, a flat vane piston secured to and extending radially of said drive shaft and mounted for sliding contact with the chamber walls to divide the chamber into two variable volume chambers, said inlet and said outlet means including a first and second passageway, and the source of energy comprising a source of pressurized fluid for creating a pressure differential across said piston, whereby said piston moves within said chamber and transmits rotary motion to said drive shaft.

3. In the log peeling lathe of claim 2, the source of power includes a pair of slip rings slidably mounted on the circumference of the support housing for providing a continuous path of power flow between the energy source, inlet and outlet means, and said chamber.

4. In a log peeling lathe of the type having an axially and rotary movable spindle carrying a face plate on the end of the spindle for engagement with the end of a log, a pair of arms slidably mounted within the body of said face plate and on the end of said spindle for radial inward and outward movement, means for extending said arms substantially beyond the periphery of said face plate and to retract said arms to an inward position, said arm each having log end engaging dogs mounted thereon, said dogs formed with sharpened edges aligned with the direction of movement of said arms whereby said dogs are aligned to slice through the end of a log during arm retraction and extension.

(References on following page)

References Cited by the Examiner

UNITED STATES PATENTS

| | | |
|---|---|---|
| 809,552 | 1/1906 | Buffelen. |
| 1,100,802 | 6/1914 | Wesolowski 279—117 |
| 2,590,509 | 3/1952 | Church 279—117 |
| 3,052,272 | 9/1962 | Yock 144—209 |

FOREIGN PATENTS

| | | |
|---|---|---|
| 627,450 | 8/1949 | Great Britain. |
| 246,317 | 9/1947 | Switzerland. |

WILLIAM W. DYER, Jr., *Primary Examiner.*

ANDREW R. JUHASZ, DONALD R. SCHRAN,
*Examiners.*